(12) United States Patent
Zhang et al.

(10) Patent No.: US 12,278,364 B2
(45) Date of Patent: Apr. 15, 2025

(54) BATTERY CELL, BATTERY, AND ELECTRICAL DEVICE

(71) Applicant: CONTEMPORARY AMPEREX TECHNOLOGY (HONG KONG) LIMITED, Hong Kong (CN)

(72) Inventors: Cuiping Zhang, Ningde (CN); Changlong Han, Ningde (CN); Zhe Zhang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/933,920

(22) Filed: Oct. 31, 2024

(65) Prior Publication Data

US 2025/0062335 A1 Feb. 20, 2025

Related U.S. Application Data

(63) Continuation of application No. PCT/CN2023/105973, filed on Jul. 5, 2023.

(30) Foreign Application Priority Data

Jul. 19, 2022 (CN) .......................... 202210854949.2

(51) Int. Cl.
 *H01M 4/505* (2010.01)
 *H01M 4/131* (2010.01)
 (Continued)

(52) U.S. Cl.
 CPC ........... *H01M 4/505* (2013.01); *H01M 4/131* (2013.01); *H01M 4/133* (2013.01); *H01M 4/134* (2013.01);
 (Continued)

(58) Field of Classification Search
 CPC ...... H01M 4/505; H01M 4/131; H01M 4/133; H01M 4/134; H01M 10/0568; H01M 10/0569; H01M 50/103; H01M 50/202; H01M 2004/027; H01M 2004/028; H01M 2300/0028
 See application file for complete search history.

(56) References Cited

FOREIGN PATENT DOCUMENTS

| CN | 106207016 A | 12/2016 |
| CN | 106848325 A | 6/2017 |

(Continued)

OTHER PUBLICATIONS

The World Intellectual Property Organization (WIPO) International Search Report and Written Opinion for PCT/CN2023/105973 Oct. 13, 2023 10 Pages (including translation).

(Continued)

*Primary Examiner* — Cynthia K Walls
(74) *Attorney, Agent, or Firm* — ANOVA LAW GROUP, PLLC

(57) ABSTRACT

A battery cell includes a housing, an electrode assembly, and an electrolyte solution. An accommodation cavity is formed in the housing. The electrode assembly is disposed in the accommodation cavity. The electrolyte solution is disposed in the accommodation cavity. An electrolyte retention coefficient a and a packing fraction b of the battery cell satisfy the following relationship: $2 \leq a/b \leq 3$, and the electrolyte retention coefficient a is in units of g/Ah.

16 Claims, 4 Drawing Sheets

(51) Int. Cl.
  *H01M 4/133* (2010.01)
  *H01M 4/134* (2010.01)
  *H01M 10/0568* (2010.01)
  *H01M 10/0569* (2010.01)
  *H01M 50/103* (2021.01)
  *H01M 50/202* (2021.01)
  *H01M 4/02* (2006.01)

(52) U.S. Cl.
  CPC ... *H01M 10/0568* (2013.01); *H01M 10/0569* (2013.01); *H01M 50/103* (2021.01); *H01M 50/202* (2021.01); *H01M 2004/027* (2013.01); *H01M 2004/028* (2013.01); *H01M 2300/0028* (2013.01)

(56) References Cited

FOREIGN PATENT DOCUMENTS

| | | |
|---|---|---|
| CN | 109687028 A | 4/2019 |
| CN | 110579569 A | 12/2019 |
| CN | 110600658 A | 12/2019 |
| CN | 111403801 A | 7/2020 |
| CN | 111628218 A | 9/2020 |
| CN | 111628219 A | 9/2020 |
| CN | 112349962 A | 2/2021 |
| CN | 113363671 A | 9/2021 |
| CN | 112349962 B | 11/2021 |
| CN | 111740148 B | 1/2022 |
| CN | 219832771 U | 10/2023 |
| JP | 2000294294 A | 10/2000 |
| JP | 2015090785 A | 5/2015 |
| WO | 2015079893 A1 | 6/2015 |

OTHER PUBLICATIONS

The State Intellectual Property Office of People's Republic of China First Office Action for Application No. 202210854949.2 Dec. 1, 2023 11 Pages (including translation).

The State Intellectual Property Office of People's Republic of China Second Office Action for Application No. 202210854949.2, Feb. 20, 2024 15 Pages (including translation).

BATTERY CELL, BATTERY, AND ELECTRICAL DEVICE

CROSS-REFERENCE TO RELATED APPLICATIONS

This application is a continuation of International Application No. PCT/CN2023/105973, filed on Jul. 5, 2023, which claims priority to Chinese Patent Application No. 202210854949.2, filed on Jul. 19, 2022 and entitled "BATTERY CELL, BATTERY, AND ELECTRICAL DEVICE", which are incorporated herein by reference in their entirety.

TECHNICAL FIELD

This application relates to the technical field of batteries, and in particular, to a battery cell, a battery, and an electrical device.

BACKGROUND

Batteries are used in consumer electronics, electric transportation, aerospace, and other fields by virtue of a high energy density, superior cycle performance, a low self-discharge rate, high safety performance, and other characteristics. The energy density and cycle performance of the batteries are prominent in such fields.

However, in the related art, the increase of the energy density of the battery may lead to a decline in the cycle performance of the battery. In other words, the problem of difficulty of achieving a high energy density and high cycle performance concurrently arises in the battery.

SUMMARY

This application provides a battery cell, a battery, and an electrical device, and can achieve a high energy density and high cycle performance concurrently.

According to a first aspect, this application provides a battery cell. The battery cell includes a housing, an electrode assembly, and an electrolyte solution. An accommodation cavity is formed in the housing. The electrode assembly is disposed in the accommodation cavity. The electrolyte solution is disposed in the accommodation cavity. An electrolyte retention coefficient a and a packing fraction b of the battery cell satisfy the following relationship: $2 \leq a/b \leq 3$, and the electrolyte retention coefficient a is in units of g/Ah.

In the above embodiment, the ratio of the electrolyte retention coefficient a to the packing fraction b of the battery cell is set to fall within the above appropriate range, thereby endowing the battery cell with both a high energy density and relatively high cycle performance.

In some embodiments of this application, the electrolyte retention coefficient a and the packing fraction b of the battery cell satisfy the following relationship: $2.25 \leq a/b \leq 2.90$. The a/b ratio falling within the above appropriate range can further endow the battery cell with both a relatively high energy density and relatively high cycle performance.

In some embodiments of this application, the electrolyte retention coefficient a falls within a value range of 1.4 g/Ah to 2.97 g/Ah. The electrolyte retention coefficient a falling within the above appropriate range can increase the energy density of the battery cell, and at the same time, enable the battery cell to retain an appropriate amount of electrolyte solution, thereby achieving the purpose of improving the cycle performance of the battery cell.

In some embodiments of this application, the electrolyte retention coefficient a falls within a value range of 1.8 g/Ah to 2.3 g/Ah. The electrolyte retention coefficient a falling within the above appropriate range can increase the energy density of the battery cell, and at the same time, further improve the cycle performance of the battery cell.

In some embodiments of this application, the packing fraction b of the battery cell falls within a value range of 80% to 99%. The packing fraction b of the battery cell falling within the above appropriate range can endow the battery cell with relatively high cycle performance, and at the same time, increase the energy density of the battery cell.

In some embodiments of this application, the packing fraction b of the battery cell falls within a value range of 85% to 95%. The packing fraction b of the battery cell falling within the above appropriate range can improve the cycle performance of the battery cell, and at the same time, further increase the energy density of the battery cell.

In some embodiments of this application, the electrode assembly includes a positive electrode plate, a negative electrode plate, and a separator. The positive electrode plate includes a positive current collector and a positive active material layer disposed on at least one surface of the positive current collector. The positive active material layer includes a positive active material. The negative electrode plate includes a negative current collector and a negative active material layer disposed on at least one surface of the negative current collector. The negative active material layer includes a negative active material. The separator is disposed between the positive electrode plate and the negative electrode plate. The positive active material is at least one selected from lithium cobalt oxide positive active material, lithium iron phosphate positive active material, lithium manganese oxide positive active material, lithium-rich positive active material, or a ternary positive active material. The negative active material is at least one selected from a carbon-containing negative active material, a silicon-containing negative active material, an alloy negative active material, a lithium-containing negative active material, or a tin-containing negative active material. In the above electrode assembly, the reasonable selection of the positive active material and the negative active material can improve the energy density and cycle performance of the battery cell.

In some embodiments of this application, the ternary positive active material is represented by the following chemical formula: $LiNi_xCo_yN_zM_{1-x-y-z}O_2$, where N is selected from Mn or Al, M is at least one selected from Co, Ni, Mn, Mg, Cu, Zn, Al, Sn, B, Ga, Cr, Sr, V, or Ti, $0 \leq x < 1$, $0 \leq y \leq 1$, $0 \leq z \leq 1$, and $x+y+z \leq 1$. The ternary positive active material represented by the above chemical formula can further increase the energy density of the battery cell.

In some embodiments of this application, the lithium-rich positive active material is represented by the following chemical formula: $Li_2MnO_3 \cdot (1-c)LiAO_2$, where A is at least one selected from Ni, Co, or Mn, and $0 \leq c < 1$. The lithium-rich positive active material represented by the above chemical formula can also further increase the energy density of the battery cell.

In some embodiments of this application, the electrolyte solution includes an organic solvent and an electrolyte salt, and the organic solvent is at least one selected from an ester compound or an ether compound. The organic solvent being at least one selected from an ester compound or an ether compound improves the cycle performance of the battery cell.

In some embodiments of this application, the ester compound is at least one selected from dimethyl carbonate, diethyl carbonate, propylene carbonate, ethyl methyl carbonate, fluoroethylene carbonate, ethyl formate, ethyl acetate, or ethylene carbonate. The ester compound being any one or more selected from the above ester compounds can further improve the cycle performance of the battery cell.

In some embodiments of this application, the ether compound is at least one selected from tetrahydrofuran, 2-methylfuran, 3-methylfuran, 2-ethylfuran, 2-propylfuran, 2-butylfuran, 2,3-dimethylfuran, 2,4-dimethylfuran, 2,5-dimethylfuran, pyran, 2-methylpyran, 3-methylpyran, 4-methylpyran, benzofuran, or 2-(2-nitrovinyl) furan. The ether compound being any one or more selected from the above ether compounds can further improve the cycle performance of the battery cell.

In some embodiments of this application, a concentration of the electrolyte salt in the electrolyte solution is 0.6 mol/L to 2.0 mol/L. When falling within the above appropriate range, the concentration of the electrolyte salt in the electrolyte solution improves the cycle performance of the battery cell.

In some embodiments of this application, the electrolyte salt is at least one selected from lithium hexafluorophosphate or lithium bis(fluorosulfonyl)imide. The electrolyte salt selected from the above lithium salts can improve the high-temperature storage performance of the battery cell.

According to a second aspect, an embodiment of this application provides a battery. The battery includes the battery cell disclosed in any one of the above embodiments. Because the battery contains the battery cell disclosed in any one of the above embodiments, the battery achieves the technical effects of the battery cell, the details of which are omitted here.

According to a third aspect, an embodiment of this application provides an electrical device. The electrical device contains the battery disclosed in the above embodiment.

The foregoing description is merely an overview of the technical solutions of this application. Some specific embodiments of this application are described below illustratively to enable a clearer understanding of the technical solutions of this application, enable implementation of the technical solutions based on the subject-matter hereof, and make the foregoing and other objectives, features, and advantages of this application more evident and comprehensible.

BRIEF DESCRIPTION OF DRAWINGS

By reading the following detailed description of exemplary embodiments, a person of ordinary skill in the art becomes clearly aware of various other advantages and benefits. The drawings are merely intended to illustrate the exemplary embodiments, but not to limit this application. In all the drawings, the same reference numeral represents the same component. In the drawings.

LIST OF REFERENCE NUMERALS

Figure 1:
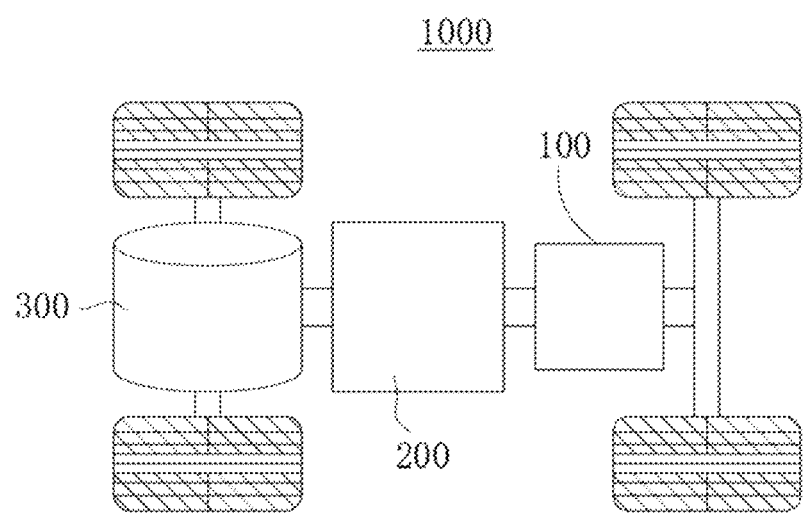
FIG. 1 is a schematic structural diagram of a vehicle according to some embodiments of this application.

1000—vehicle;
100—battery; 200—controller; 300—motor;
10—box; 11—first part; 12—second part;
20—battery cell;
21—housing;
22—electrode assembly; 221—positive tab; 222—negative tab;
23—end cap; 231—positive electrode terminal; 232—negative electrode terminal.

DETAILED DESCRIPTION OF EMBODIMENTS

Some embodiments of the technical solutions of this application are described in detail below with reference to the drawings. The following embodiments are merely intended as examples to describe the technical solutions of this application more clearly, but not intended to limit the protection scope of this application.

Unless otherwise defined, all technical and scientific terms used herein bear the same meanings as what is normally understood by a person skilled in the technical field of this application. The terms used herein are merely intended to describe specific embodiments but not to limit this application. The terms "include" and "contain" and any variations thereof used in the specification, claims, and brief description of drawings of this application are intended as non-exclusive inclusion.

In the description of some embodiments of this application, the technical terms "first" and "second" are merely intended to distinguish between different items but not intended to indicate or imply relative importance or implicitly specify the number of the indicated technical features, specific order, or order of precedence. In the description of some embodiments of this application, unless otherwise expressly specified, "a plurality of" means two or more.

Reference to an "embodiment" herein means that a specific feature, structure or characteristic described with reference to this embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described herein may be combined with other embodiments.

In the description of embodiments of this application, the term "and/or" merely indicates a relationship between related items, and represents three possible relationships. For example, "A and/or B" may represent the following three circumstances: A alone, both A and B, and B alone. In addition, the character "/" herein generally indicates an "or" relationship between the item preceding the character and the item following the character.

In the description of embodiments of this application, the term "a plurality of" means two or more (including two). Similarly, "a plurality of groups" means two or more groups (including two groups), and "a plurality of pieces" means two or more pieces (including two pieces).

In the description of embodiments of this application, a directional or a positional relationship indicated by the terms such as "center", "longitudinal", "transverse", "length", "width", "thickness", "up", "down", "before", "after", "left", "right", "vertical", "horizontal", "top", "bottom", "in", "out", "clockwise", "counterclockwise", "axial", "radial", and "circumferential" is a directional or positional relationship based on the illustration in the drawings, and is merely intended for ease or brevity of description of embodiments of this application, but not intended to indicate or imply that the indicated device or component is necessarily located in the specified direction or constructed or operated in the specified direction. Therefore, such terms are not to be understood as a limitation on embodiments of this application.

In the description of this application, unless otherwise expressly specified and defined, the technical terms such as "mount", "concatenate", "connect", and "fix" are generic in a broad sense, for example, mean a fixed connection, a detachable connection, or a one-piece configuration; or mean a mechanical connection or an electrical connection; or mean a direct connection or an indirect connection implemented through an intermediary; or mean internal communication between two components or interaction between two components. A person of ordinary skill in the art can understand the specific meanings of the terms in some embodiments of this application according to specific situations.

In this application, a battery cell may be a lithium-ion secondary battery cell, a lithium-ion primary battery cell, a lithium-sulfur battery cell, a sodium-ion battery cell, a magnesium-ion battery cell, or the like. The type of the battery cell is not limited herein. The battery cell may be in various shapes such as cylindrical, flat, cuboidal or other shapes. The shape of the battery cell is not limited herein. In terms of the packaging form, the battery cell is typically classed into three types: cylindrical battery cell, prismatic battery cell, and pouch-type battery cell. The type of the battery cell is not limited herein.

The battery mentioned in embodiments of this application means a unitary physical module that includes one or more battery cells to provide a higher voltage and a higher capacity. For example, the battery mentioned in this application may include a battery module, a battery pack, or the like. A battery typically includes a box configured to package one or more battery cells. The box prevents liquid or other foreign matters from affecting the charging or discharging of the battery cells.

A battery cell includes an electrode assembly and an electrolyte solution. The electrode assembly includes a positive electrode plate, a negative electrode plate, and a separator. The battery cell works primarily by shuttling metal ions between the positive electrode plate and the negative electrode plate. The positive electrode plate includes a positive current collector and a positive active material layer. A surface of the positive current collector is coated with the positive active material layer. Of the positive current collector, a part uncoated with the positive active material layer protrudes from a part coated with the positive active material layer. The part, uncoated with the positive active material layer, of the positive current collector, serves as a positive tab.

The performance metrics of a battery include energy density and cycle performance. The energy density is the electrical energy released per unit volume or per unit mass of the battery on average. Cycle performance is measured by the cumulative number of cycles of a rechargeable battery that can still keep an appropriate state of health, and is indicated by the number of complete charge-discharge cycles undergone by the battery before the battery fails or before the capacity of the battery begins to fade. Therefore, a high energy density and high cycle performance can improve the driving range and service life of the electrical device containing the battery. Currently, the energy density and cycle performance of the battery are typically improved by increasing the content of active material and the amount of electrolyte solution in the battery.

However, the inventor hereof finds that, if the content of the active material in the battery is increased within a limited space of the battery housing, the space occupied by the active material will increase, and the space left for the electrolyte solution will decrease, thereby causing a decrease in the amount of electrolyte solution in the battery, and in turn, impairing the cycle performance of the battery. However, the increase in the amount of electrolyte solution in the battery results in a decline in the energy density of the battery, and may even cause more side reactions, and shorten the service life of the battery. Therefore, it is difficult to achieve a high energy density and high cycle performance concurrently in the battery.

In view of the above problem, an embodiment of this application provides a battery cell, a battery, and an electrical device to achieve a high energy density and high cycle performance of the battery concurrently.

The battery cell, battery, and the like disclosed herein may be assembled to form a power supply system of the electrical device to ensure a long driving range and a long service life of the electrical device.

The electrical devices mentioned in this application may be, but are not limited to, a mobile phone, a tablet, a notebook computer, an electric toy, an electric tool, an electric power cart, an electric vehicle, a ship, a spacecraft, or the like. The electric toy may include stationary or mobile electric toys, such as a game console, an electric car toy, an electric ship toy, an electric airplane toy, and the like. The spacecraft may include an airplane, a rocket, a space shuttle, a spaceship, and the like.

For ease of description in the following embodiments, a vehicle is used as an example of the electrical device according to an embodiment of this application.

FIG. 1 is a schematic structural diagram of a vehicle according to some embodiments of this application.

Referring to FIG. 1, a battery 100 is disposed inside the vehicle 1000. The battery 100 may be disposed at the bottom, front, or rear of the vehicle 1000. The battery 100 may be configured to supply power to the vehicle 1000. For example, the battery 100 may serve as an operating power supply of the vehicle 1000. The vehicle 1000 may further include a controller 200 and a motor 300. The controller 200 is configured to control the battery 100 to supply power to the motor 300, for example, to meet electrical energy requirements in starting, navigating, or running the vehicle 1000.

In some embodiments of this application, the battery 100 serves not only as an operating power supply of the vehicle 1000, but may also serve as a driving power supply of the vehicle 1000 to provide driving power for the vehicle 1000 in place of or partly in place of fuel oil or natural gas.

Figure 2:
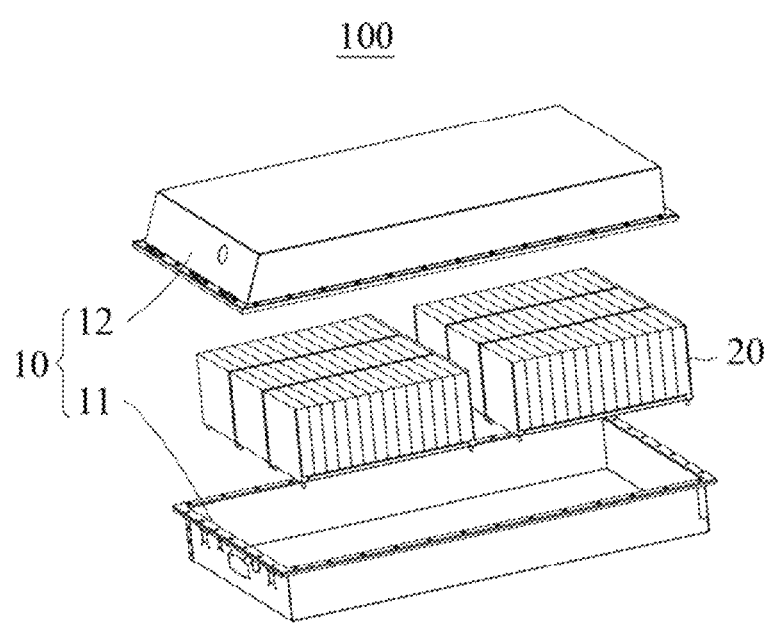
FIG. 2 is an exploded view of a battery according to some embodiments of this application.

FIG. 2 is a schematic structural diagram of a battery according to some embodiments of this application.

Referring to FIG. 2, the battery 100 includes a box 10 and a battery cell 20. The box 10 is configured to accommodate the battery cell 20.

The box 10 is a component configured to accommodate the battery cell 20. The box 10 provides an accommodation space for the battery cell 20. The box 10 may be in various structures. In some embodiments, the box 10 may include a first part 11 and a second part 12. The first part 11 and the second part 12 fit and cover each other to define the accommodation space configured to accommodate the battery cell 20. The first part 11 and the second part 12 may be in various shapes, such as a cuboid or cylinder. The first part 11 may be a hollow structure opened up at one side. The second part 12 may also be a hollow structure opened up at one side. The open-up side of the second part 12 fits and covers the open-up side of the first part 11 to form the box 10 that provides the accommodation space. Alternatively, the first part 11 is a hollow structure opened up at one side, and the second part 12 assumes a plate-shaped structure. The second part 12 fits and covers the open-up side of the first part 11 to form the box 10 that provides the accommodation space. Airtightness may be implemented between the first part 11 and the second part 12 by a sealing element. The sealing element may be a sealing ring, a sealant, or the like.

The battery 100 may contain one or more battery cells 20. If there are a plurality of battery cells 20, the plurality of battery cells 20 may be connected in series, parallel, or series-and-parallel pattern. The series-and-parallel pattern means a combination of series connection and parallel connection of the plurality of battery cells 20. The plurality of battery cells 20 are connected in series, parallel, or series-and-parallel pattern to form a battery module first, and then a plurality of battery modules are connected in series, parallel, or series-and-parallel pattern to form an entirety that is to be accommodated in the box 10. Alternatively, all battery cells 20 are directly connected in series, parallel, or series-and-parallel pattern, and then the entirety of all battery cells 20 is accommodated in the box 10.

Figure 3:
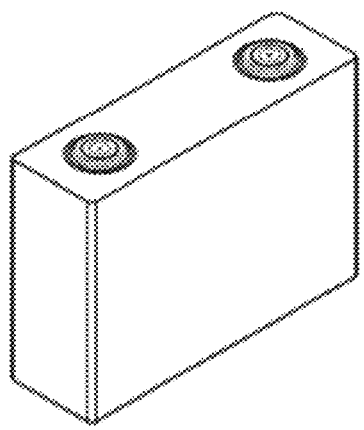
FIG. 3 is a schematic structural diagram of a battery cell according to some embodiments of this application.
Figure 4:
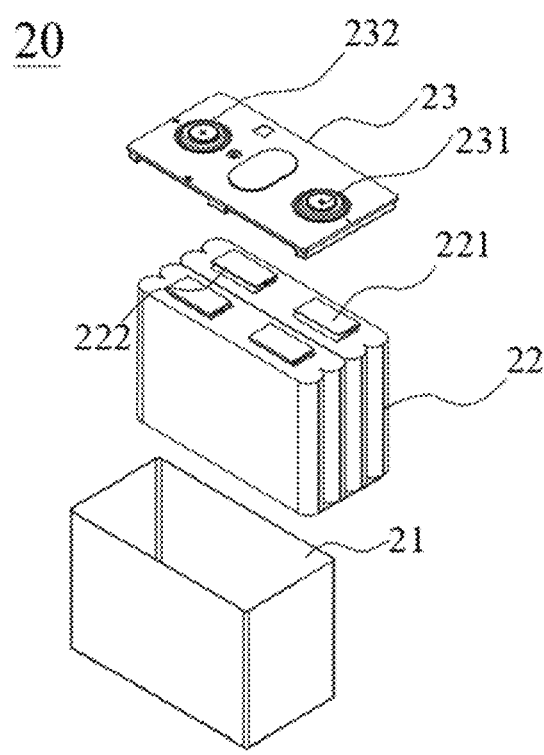
FIG. 4 is an exploded view of a battery cell according to some embodiments of this application.

FIG. 3 is a schematic structural diagram of a battery cell according to some embodiments of this application. FIG. 4 is an exploded view of a battery cell according to some embodiments of this application.

Referring to FIG. 3 and FIG. 4, the battery cell 20 includes a housing 21, an electrode assembly 22, and an electrolyte solution. An accommodation cavity is formed in the housing 21. The electrode assembly 22 is disposed in the accommodation cavity. The electrolyte solution is disposed in the accommodation cavity. An electrolyte retention coefficient a and a packing fraction b of the secondary battery satisfy the following relationship: $2 \leq a/b \leq 3$, and the electrolyte retention coefficient a is in units of g/Ah.

The housing 21 is a component configured to accommodate the electrode assembly 22. The housing 21 assumes a hollow structure opened at one end, that is, an accommodation cavity. The housing 21 may be in various shapes such as a cylinder or cuboid, without being particularly limited herein. The housing 21 may be made of a variety of materials such as copper, iron, aluminum, steel, or aluminum alloy, without being particularly limited herein.

Still referring to FIG. 4, one or more electrode assemblies 22 may be accommodated in the housing 21. For example, as shown in FIG. 4, there are a plurality of electrode assemblies 22. The plurality of electrode assemblies 22 are stacked up.

The electrode assembly 22 is a component in which electrochemical reactions occur in the battery cell 20, and may be a jelly-roll structure formed by winding, or may be a stacked structure formed by stacking, without being particularly limited herein.

In an embodiment of this application, the electrolyte retention coefficient a is a ratio of the amount of retained electrolyte solution to the first-cycle discharge capacity of the battery cell 20. The packing fraction b is a ratio of the volume of the electrode assembly 22 in the battery to the volume of the accommodation cavity in the housing 21. When the ratio of the electrolyte retention coefficient a to the packing fraction b of the battery cell 20, denoted as a/b, is set to fall within the above appropriate range, the battery cell 20 is endowed with both a high energy density and relatively high cycle performance.

In some embodiments of this application, the electrolyte retention coefficient a and the packing fraction b of the battery cell 20 satisfy the following relationship: $2.25 \leq a/b \leq 2.90$.

In the above embodiments, the ratio of the electrolyte retention coefficient a to the packing fraction b of the battery cell 20, denoted as a/b, is set to fall within the above appropriate range, thereby further endowing the battery cell 20 with both a relatively high energy density and relatively high cycle performance.

As an example, the ratio of the electrolyte retention coefficient a to the packing fraction b of the battery cell 20, denoted as a/b, may be, but is not limited to 2, 2.05, 2.1, 2.15, 2.2, 2.25, 2.3, 2.35, 2.4, 2.45, 2.5, 2.55, 2.6, 2.65, 2.7, 2.75, 2.8, 2.85, 2.9, 2.95, or 3.

In some embodiments of this application, the electrolyte retention coefficient a falls within a value range of 1.4 g/Ah to 2.97 g/Ah.

In the above embodiments, on the premise that the electrolyte retention coefficient a and the packing fraction b of the battery cell 20 satisfy $2 \leq a/b \leq 3$, the electrolyte retention coefficient a falling within the above appropriate range can increase the energy density of the battery cell 20, and at the same time, enable the battery cell 20 to retain an appropriate amount of electrolyte solution, thereby improving the cycle performance of the battery cell 20. The capacity retention rate of the battery cell 20 after 1000 cycles undergone at 25° C. falls within the range of 80% to 92%. In addition, the above setting can improve the storage performance of the battery cell 20 at high temperature. The capacity retention rate of the battery cell 20 after 90 days of storage at 60° C. is 86% to 96%.

In some embodiments of this application, the electrolyte retention coefficient a falls within a value range of 1.8 g/Ah to 2.3 g/Ah.

In the above embodiments, on the premise that the electrolyte retention coefficient a and the packing fraction b of the battery cell 20 satisfy $2 \leq a/b \leq 3$, the electrolyte retention coefficient a falling within the above appropriate range can increase the energy density of the battery cell 20, and at the same time, further improve the cycle performance of the battery cell 20. The capacity retention rate of the battery cell 20 after 1000 cycles undergone at 25° C. falls within the range of 85% to 92%. In addition, the above setting can further improve the storage performance of the battery cell 20 at high temperature. The capacity retention rate of the battery cell 20 after 90 days of storage at 60° C. is 90% to 96%.

As an example, the electrolyte retention coefficient a may be, but is not limited to, 1.4 g/Ah, 1.41 g/Ah, 1.42 g/Ah, 1.43 g/Ah, 1.44 g/Ah, 1.45 g/Ah, 1.46 g/Ah, 1.47 g/Ah, 1.48 g/Ah, 1.49 g/Ah, 1.50 g/Ah, 1.51 g/Ah, 1.52 g/Ah, 1.53 g/Ah, 1.54 g/Ah, 1.55 g/Ah, 1.56 g/Ah, 1.57 g/Ah, 1.58 g/Ah, 1.59 g/Ah, 1.60 g/Ah, 1.61 g/Ah, 1.62 g/Ah, 1.63 g/Ah, 1.64 g/Ah, 1.65 g/Ah, 1.66 g/Ah, 1.67 g/Ah, 1.68 g/Ah, 1.69 g/Ah, 1.70 g/Ah, 1.71 g/Ah, 1.72 g/Ah, 1.73 g/Ah, 1.74 g/Ah, 1.75 g/Ah, 1.76 g/Ah, 1.77 g/Ah, 1.78 g/Ah, 1.79 g/Ah, 1.80 g/Ah, 1.81 g/Ah, 1.82 g/Ah, 1.83 g/Ah, 1.84 g/Ah, 1.85 g/Ah, 1.86 g/Ah, 1.87 g/Ah, 1.88 g/Ah, or 1.90 g/Ah to 2.0 g/Ah, 2.01 g/Ah, 2.02 g/Ah, 2.03 g/Ah, 2.04 g/Ah to 2.19 g/Ah, 2.20 g/Ah, 2.21 g/Ah to 2.29 g/Ah, 2.30 g/Ah, 2.31 g/Ah to 2.69 g/Ah, 2.70 g/Ah, 2.71 g/Ah, 2.72 g/Ah, 2.73 g/Ah, 2.74 g/Ah, 2.75 g/Ah, 2.76 g/Ah, 2.77 g/Ah, 2.78 g/Ah, 2.79 g/Ah, 2.80 g/Ah, 2.81 g/Ah, 2.82 g/Ah, 2.83 g/Ah, 2.84 g/Ah, 2.85 g/Ah, 2.86 g/Ah, 2.87 g/Ah, 2.88 g/Ah, 2.89 g/Ah, 2.90 g/Ah, 2.91 g/Ah, 2.92 g/Ah, 2.93 g/Ah, 2.94 g/Ah, 2.95 g/Ah, 2.96 g/Ah, or 2.97 g/Ah.

In some embodiments of this application, the packing fraction b of the battery cell 20 falls within a value range of 80% to 99%.

In the above embodiments, on the premise that the electrolyte retention coefficient a and the packing fraction b of the battery cell 20 satisfy 2≤a/b≤3, the packing fraction b of the battery cell 20 falling within the above appropriate range can improve the cycle performance of the battery cell 20, and at the same time, increase the energy density of the battery cell 20. The gravimetric energy density of the battery cell 20 falls within a range of 190 Wh/g to 213 Wh/g.

In some embodiments of this application, the packing fraction b of the battery cell 20 falls within a value range of 85% to 95%.

In the above embodiments, on the premise that the electrolyte retention coefficient a and the packing fraction b of the battery cell 20 satisfy 2≤a/b≤3, the packing fraction b of the battery cell 20 falling within the above appropriate range can improve the cycle performance of the battery cell 20, and at the same time, increase the energy density of the battery cell 20. The gravimetric energy density of the battery cell 20 falls within a range of 196 Wh/g to 213 Wh/g.

As an example, the packing fraction b of the battery cell 20 may be, but is not limited to, 80%, 81%, 82%, 83%, 84%, 85%, 86%, 87%, 88%, 89%, 90%, 91%, 92%, 93%, 94%, 95%, 96%, 97%, 98%, or 99%.

In some embodiments of this application, the electrode assembly 22 includes a positive electrode plate, a negative electrode plate, and a separator. The positive electrode plate includes a positive current collector and a positive active material layer disposed on at least one surface of the positive current collector. The positive active material layer includes a positive active material. The negative electrode plate includes a negative current collector and a negative active material layer disposed on at least one surface of the negative current collector. The negative active material layer includes a negative active material. The separator is disposed between the positive electrode plate and the negative electrode plate. The positive active material is at least one selected from lithium cobalt oxide positive active material, lithium iron phosphate positive active material, lithium manganese oxide positive active material, lithium-rich positive active material, or a ternary positive active material. The negative active material is at least one selected from a carbon-containing negative active material, a silicon-containing negative active material, an alloy negative active material, a lithium-containing negative active material, or a tin-containing negative active material.

The positive current collector may be made of a metal foil, a porous metal sheet, or another material. As an example, the positive current collector may be, but is not limited to, a foil or porous sheet of metal such as copper, nickel, titanium, or silver, or an alloy thereof. Further, in some specific embodiments of this application, the positive current collector is an aluminum foil.

The negative current collector may be made of a metal foil, a porous metal sheet, or another material. As an example, the negative current collector may be, but is not limited to, a foil or porous sheet of metal such as copper, nickel, titanium, or iron, or an alloy thereof. Further, in some specific embodiments of this application, the negative current collector is a copper foil.

In such embodiments, the reasonable selection of the positive active material and the negative active material can improve the energy density and cycle performance of the battery cell 20.

In some embodiments of this application, the ternary positive active material is represented by the following chemical formula: $LiNi_xCo_zN_zM_{1-x-y-z}O_2$, where N is selected from Mn or Al, M is at least one selected from Co, Ni, Mn, Mg, Cu, Zn, Al, Sn, B, Ga, Cr, Sr, V, or Ti, 0≤x<1, 0≤y≤1, 0≤z≤1, and x+y+z≤1. The ternary positive active material represented by the above chemical formula can further increase the energy density of the battery cell 20.

In some embodiments of this application, the lithium-rich positive active material is represented by the following chemical formula: $Li_2MnO_3·(1-c) LiAO_2$, where A is at least one selected from Ni, Co, or Mn, and 0≤c<1. The lithium-rich positive active material represented by the above chemical formula can also further increase the energy density of the battery cell 20.

In some embodiments of this application, the positive active material layer may further include a conductive agent and a binder. The types of the conductive agent and the binder in the positive active material are not limited in this embodiment, and may be selected according to actual needs.

As an example, the conductive agent may be, but is not limited to, one or more of graphite, superconducting carbon, acetylene black, carbon black, Ketjen black, carbon dots, carbon nanotubes, graphene, or carbon nanofibers. The binder may be, but is not limited to, one or more of styrene-butadiene rubber (SBR), water-based acrylic resin, carboxymethyl cellulose (CMC), polyvinylidene difluoride (PVDF), polytetrafluoroethylene (PTFE), polyvinyl butyral (PVB), ethylene-vinyl acetate copolymer (EVA), poly(vinylidene fluoride-co-tetrafluoroethylene-co-propylene), poly(vinylidene fluoride-co-hexafluoropropylene-co-tetrafluoroethylene), poly(tetrafluoroethylene-co-hexafluoropropylene), fluorine-containing acrylic resin, or polyvinyl alcohol (PVA).

The positive electrode plate of this application is prepared by the following method: mixing the positive active material, the conductive agent, and the binder at a specified mass ratio in an appropriate amount of NMP solvent, and stirring well to form a homogeneous positive electrode slurry; applying the positive electrode slurry onto a surface of the positive current collector aluminum foil, and performing steps such as drying and cold-pressing to obtain a positive electrode plate.

In some embodiments of this application, the negative active material may include at least one of natural graphite, artificial graphite, mesocarbon microbeads (MCMB for short), hard carbon, soft carbon, silicon, a silicon-carbon composite, a Li—Sn alloy, a Li—Sn—O alloy, Sn, SnO, $SnO_2$, spinel-structured lithiated $TiO_2$—$Li_4Ti_5O_{12}$, or a Li—Al alloy.

In some embodiments of this application, the negative active material layer may further include a conductive agent and a binder. The types of the conductive agent and the binder in the negative active material layer are not particularly limited herein, and may be selected according to actual needs.

As an example, the conductive agent may be, but is not limited to, one or more of graphite, superconducting carbon, acetylene black, carbon black, Ketjen black, carbon dots, carbon nanotubes, graphene, or carbon nanofibers. The binder may be, but is not limited to, one or more of styrene-butadiene rubber (SBR), polyvinylidene difluoride (PVDF), polytetrafluoroethylene (PTFE), polyvinyl butyral (PVB), water-based acrylic resin, or carboxymethyl cellulose (CMC).

In an embodiment of this application, the negative electrode plate is prepared by the following method: mixing the negative active material, the conductive agent, and the binder at a specified mass ratio in an appropriate amount of deionized water, and stirring well to form a homogeneous negative electrode slurry; applying the negative electrode slurry onto a surface of the negative current collector copper foil, and performing steps such as drying and cold-pressing to obtain a negative electrode plate.

In addition, the electrode assembly 22 includes a positive tab 221 and a negative tab 222. The positive tab 221 may be a part uncoated with the positive active material layer on the positive electrode plate, and the negative tab 222 may be a part uncoated with the negative active material layer on the negative electrode plate.

The type of the separator is not specifically limited in this embodiment of this application, and may be any well-known porous separator that is highly chemically and mechanically stable. In some embodiments, the material of the separator may be one or more selected from glass fiber, non-woven fabric, polyethylene, polypropylene, or polyvinylidene difluoride. The separator may be a single-layer film or a multilayer composite film. When the separator is a multilayer composite film, materials in different layers may be identical or different.

Still referring to FIG. 4, in some embodiments of this application, the battery cell 20 may further include an end cap 23. The end cap 23 is a component that caps off the opening of the housing 21 to isolate the internal environment from the external environment of the battery cell 20. The end cap 23 fits and covers the opening of the housing 21. The end cap 23 and the housing 21 jointly define an airtight space configured to accommodate the electrode assembly 22, the electrolyte solution, and other components. The shape of the end cap 23 may fit the shape of the housing 21. For example, the housing 21 is a cuboidal structure, and the end cap 23 is a rectangular plate-shaped structure that fits the housing 21. For another example, the housing 21 is a cylindrical structure, and the end cap 23 is a circular plate-shaped structure that fits the housing 21. The end cap 23 may be made of a variety of materials such as copper, iron, aluminum, steel, or an aluminum alloy. The material of the end cap 23 may be identical to or different from the material of the housing 21.

An electrode terminal may be disposed on the end cap 23. The electrode terminal is configured to be electrically connected to the electrode assembly 22 to output electrical energy of the battery cell 20. The electrode terminal may include a positive electrode terminal 231 and a negative electrode terminal 232. The positive electrode terminal 231 is configured to be electrically connected to the positive tab 221. The negative electrode terminal 232 is configured to be electrically connected to the negative tab 222. The positive electrode terminal 231 may be connected to the positive tab 221 directly or indirectly, and the negative electrode terminal 232 may be connected to the negative tab 222 directly or indirectly.

In some embodiments of this application, the electrolyte solution includes an organic solvent and an electrolyte salt, and the organic solvent is at least one selected from an ester compound or an ether compound.

In the above embodiments, the organic solvent being at least one selected from an ester compound or an ether compound improves the cycle performance of the battery cell 20.

In some embodiments of this application, the ester compound is at least one selected from dimethyl carbonate, diethyl carbonate, propylene carbonate, ethyl methyl carbonate, fluoroethylene carbonate, ethyl formate, ethyl acetate, or ethylene carbonate. The ester compound being any one or more selected from the above ester compounds can further improve the cycle performance of the battery cell 20.

In some embodiments of this application, the ether compound is at least one selected from tetrahydrofuran, 2-methylfuran, 3-methylfuran, 2-ethylfuran, 2-propylfuran, 2-butylfuran, 2,3-dimethylfuran, 2,4-dimethylfuran, 2,5-dimethylfuran, pyran, 2-methylpyran, 3-methylpyran, 4-methylpyran, benzofuran, or 2-(2-nitrovinyl) furan. The ether compound being any one or more selected from the above ether compounds can further improve the cycle performance of the battery cell 20.

In some embodiments of this application, the electrolyte solution further includes an additive. For example, the additive may be at least one selected from ethylene carbonate, ethylene sulfate, lithium difluoro (oxalato) borate, lithium difluorophosphate, lithium tetrafluoroborate, 1,3-propane sultone, lithium trifluoromethanesulfonate, or lithium bis(oxalato) borate.

In some embodiments of this application, a concentration of the electrolyte salt in the electrolyte solution is 0.6 mol/L to 2.0 mol/L. When falling within the above appropriate range, the concentration of the electrolyte salt in the electrolyte solution improves the ion conductivity of the electrolyte solution and the mobility of metal ions in the electrolyte solution, thereby improving the cycle performance of the battery cell 20.

As an example, the concentration of the electrolyte salt in the electrolyte solution may be, but is not limited to, 0.6 M, 0.7 M, 0.8 M, 0.9 M, 1.0 M, 1.1 M, 1.2 M, 1.3 M, 1.4 M, 1.5 M, 1.6 M, 1.7 M, 1.8 M, 1.9 M, or 2.0 M.

In the above embodiments, the electrolyte salt may be a lithium salt. For example, the lithium salt may be LiCl, LiBr, LiI, LiClO$_4$, LiBF$_4$, LiB$_{10}$Cl$_{10}$, LiPF$_6$, LIFSI, LiCF$_3$SO$_3$, LiCF$_3$CO$_2$, LiC$_4$BO$_8$, LiAsF$_6$, LiSbF$_6$, LiAlCl$_4$, CH$_3$SO$_3$Li, CF$_3$SO$_3$Li, (CF$_3$SO$_2$)$_2$NLi, (C$_2$F$_5$SO$_2$)$_2$NLi, (SO$_2$F)$_2$NLi, or (CF$_3$SO$_2$)$_3$CLi.

In some embodiments of this application, the electrolyte salt is at least one selected from LiPF$_6$ or LiFSI. The electrolyte salt selected from the above lithium salts can improve the high-temperature storage performance of the battery cell 20.

An embodiment of this application provides a battery. The battery includes the battery cell disclosed in any one of the above embodiments. Because the battery contains the battery cell disclosed in any one of the above embodiments, the battery achieves the technical effects of the battery cell, the details of which are omitted here.

An embodiment of this application provides an electrical device. The electrical device contains the battery disclosed in the above embodiment.

The following embodiments are more detailed descriptions of the subject-matter disclosed herein. The embodiments are merely intended as illustrative descriptions because, evidently, a person skilled in the art may make various modifications and changes to such embodiments without departing from what is disclosed herein. Unless otherwise specified, all fractions, percentages, and ratios mentioned in the following embodiments are values by weight. All reagents used in the embodiments are commercially available or can be synthesized according to conventional methods, and can be directly put into use without a need of further processing. All the instruments used in the embodiments are commercially available.

Embodiment 1

Preparing a Positive Electrode Plate

Mixing $LiNi_{0.8}Co_{0.1}Mn_{0.1}O_2$ as a positive active material, Super P as a conductive agent, and polyvinylidene difluoride (PVDF) as a binder at a mass ratio of 95:3:2 in an appropriate amount of N-methyl-pyrrolidone (NMP) solvent, and stirring well to form a uniform positive electrode slurry in which the solid content is 50 wt %. Applying the positive electrode slurry onto a surface of a current collector aluminum foil, drying the slurry at 85° C., performing cold-pressing, edge trimming, shearing, and slitting, and drying the resulting plate in an 85° C. vacuum environment for 4 hours to obtain a positive electrode plate.

Preparing a Negative Electrode Plate

Mixing graphite as a negative active material, Super P as a conductive agent, CMC as a thickener, and styrene-butadiene rubber (SBR) as a binder at a mass ratio of 92:3:2.5:2.5 in deionized water, stirring well to form a homogeneous negative electrode slurry in which the solid content is 30 wt %. Applying the negative electrode slurry onto a surface of a current collector copper foil, and drying the slurry at 85° C. Subsequently, performing cold-pressing, edge trimming, shearing, and slitting, and then drying the resulting plate in a 120° C. vacuum environment for 12 hours to obtain a negative electrode plate.

Preparing a Separator

Using a 16 μm-thick polyethylene (PE) film as a separator.

Preparing an Electrolyte Solution

Mixing ethylene carbonate (EC) and ethyl methyl carbonate (EMC) at a ratio of 3:7 W %/W % in a glovebox filled with argon (in which the water content is lower than 10 ppm and the oxygen content is less than 1 ppm), and then adding 2% vinylene carbonate. Stirring well and then adding 1 mol of $LiFP_6$ into the resulting solution slowly, whereupon the $LiFP_6$ is fully dissolved to obtain an electrolyte solution.

Preparing a Battery Cell

Stacking the positive electrode plate, the separator, and the negative electrode plate in sequence, and winding the stacked structure to obtain an electrode assembly. Placing the electrode assembly into an outer package, injecting the electrolyte solution prepared above, and performing steps such as packaging, standing, chemical formation, and aging to obtain a battery cell.

Embodiments 2 to 10 and Comparative Embodiments 1 to 2

The preparation method is similar to that in Embodiment 1 except that the electrolyte retention coefficient and the packing fraction are adjusted, as detailed in Table 1.

Test Part

1) Testing the Capacity of the Battery Cell

Leaving a battery to stand in a 25° C. environment for 60 minutes, and then charging the battery at a current of 1C until the voltage reaches 4.25 V, and then charging the battery at a constant voltage until the current drops to 0.05C. Subsequently, leaving the battery to stand for 30 minutes, and then discharging the battery at a current of 1C until the voltage reaches 2.8 V, leaving the battery to stand for 30 minutes, and recording the discharge capacity $D_1$.

2) Testing the Electrolyte Retention Amount

Weighing the battery cell to be disassembled, and recording the weight as $M_1$. Disassembling the battery cell, pouring out the free electrolyte solution, adding dimethyl carbonate (DMC) into the housing, extracting the essence for three times, pouring out the DMC residual liquid, putting the components such as the electrode assembly and the housing into an oven to remove DMC thoroughly, and then weighing the resulting product to obtain a weight, denoted as $M_2$. Calculating the electrolyte retention amount as: electrolyte retention amount=$M_1-M_2$, and calculating the electrolyte retention coefficient a as: $a=(M_1-M_2)/D_1$.

3) Testing the Packing Fraction of the Battery Cell

Immersing the electrode assembly in water, and measuring the volume $V_1$ of the electrode assembly by a water displacement method based on the Archimedes' principle. Calculating the volume of a regular housing directly, denoted as $V_2$, or, calculating the volume of an irregular housing by determining how much water that the housing displaces. Calculating the packing fraction b of the battery cell as: $b=V_1/V_2$.

4) Testing the Cycle Performance of the Battery Cell

Charging a battery cell at a constant current of 0.5C in a 25° C. environment until the voltage reaches 4.25 V, and then charging the battery cell at a constant voltage of 4.25 V until the current drops to 0.05 C. Subsequently, discharging the battery cell at a constant current of 1C until the voltage drops to 2.8 V. Recording the discharge capacity at this time as $C_1$. Recording the discharge capacity of the battery cell at the end of the 1000th cycle as $C_2$. Calculating the capacity retention rate at the end of the 1000th cycle of the battery cell as: capacity retention rate (%)=$(C_2/C_1)\times100\%$. The test results are shown in Table 1.

5) Testing the High-Temperature Storage Performance of the Battery Cell

Charging a battery cell at a current of 1C in a 25° C. environment until the voltage reaches 4.25 V, and then charging the battery cell at a constant voltage until the current drops to 0.05 C. Leaving the battery cell to stand for 30 minutes, and then discharging the battery cell at a current of 1C until the voltage drops to 2.8 V. Recording the discharge capacity at this time as $C_3$. Charging the battery cell at a current of 1C until the voltage reaches 4.25 V, and then charging the battery cell at a constant voltage until the current drops to 0.05C, and then storing the battery cell in a 60° C. thermostat for 90 days. Taking out the battery cell, and waiting until the surface temperature of the battery cell returns to 25° C., and then discharging the battery cell at a current of 1C until the voltage reaches 2.8 V. Leaving the battery cell to stand for 30 minutes, and then charging the battery cell at a current of 1C until the voltage reaches 4.25 V, and then charging the battery cell at a constant voltage until the current drops to 0.05C, leaving the battery cell to stand for 30 minutes, and then discharging the battery cell at a current of 1C until the voltage drops to 2.8 V, and recording the discharge capacity as $C_4$. Calculating the reversible capacity retention rate of the battery cell after 90 days of storage at 60° C. as: reversible capacity retention rate (%)=$(C_4/C_3)\times100\%$. The test results are shown in Table 1.

6) Testing the Energy Density of the Battery Cell

Weighing the battery cell, and recording the weight as m. Denoting the discharge voltage plateau of the battery cell as P, and calculating the gravimetric energy density of the battery cell as: gravimetric energy density (Wh/g)=$D_1\times P/m$. The test results are shown in Table 1.

TABLE 1

| Serial number | Electrolyte retention coefficient a (g/Ah) | Packing fraction b | a/b | Capacity retention rate (25° C.) | High-temperature storage capacity retention rate (60° C.) | Gravimetric energy density (Wh/g) |
|---|---|---|---|---|---|---|
| Embodiment 1 | 1.80 | 80% | 3.00 | 90.3% | 95.40% | 212.8 |
| Embodiment 2 | 1.76 | 88% | 2.00 | 86.3% | 91.20% | 196.3 |
| Embodiment 3 | 2.70 | 90% | 3.00 | 85.3% | 90.70% | 195.4 |
| Embodiment 4 | 2.30 | 88% | 2.61 | 90.5% | 94.50% | 210.7 |
| Embodiment 5 | 2.00 | 85% | 2.35 | 91.0% | 95.30% | 212 |
| Embodiment 6 | 2.00 | 95% | 2.11 | 90.1% | 94.80% | 211.9 |
| Embodiment 7 | 2.83 | 99% | 2.86 | 89.5% | 93.30% | 209.5 |
| Embodiment 8 | 2.20 | 83% | 2.65 | 89.9% | 93.00% | 210 |
| Embodiment 9 | 1.8 | 90% | 2.00 | 85.7% | 90.20% | 197.4 |
| Embodiment 10 | 2.03 | 97% | 2.09 | 91.2% | 93.50% | 210.9 |
| Comparative Embodiment 1 | 1.5 | 80% | 1.875 | 67.2% | 77.20% | 176.2 |
| Comparative Embodiment 2 | 2.81 | 93% | 3.02 | 73.2% | 82.40% | 180.3 |

As can be seen from the comparison results of Embodiments 1 to 10 versus Comparative Embodiments 1 to 2 in Table 1, in the battery cell disclosed in an embodiment of this application, when the electrolyte retention coefficient a and the packing fraction b of the battery cell satisfy: $2 \leq a/b \leq 3$, the battery cell is endowed with both a high energy density and relatively high cycle performance.

Finally, it is hereby noted that the foregoing embodiments are merely intended to describe the technical solutions of this application but not to limit this application. Although this application has been described in detail with reference to the foregoing embodiments, a person of ordinary skill in the art understands that modifications may still be made to the technical solutions described in the foregoing embodiments, or equivalent replacements may still be made to some or all technical features in the technical solutions. Such modifications and equivalent replacements fall within the scope of the claims and specification hereof without making the essence of the corresponding technical solutions depart from the scope of the technical solutions of the embodiments of this application. Particularly, to the extent that no structural conflict exists, various technical features mentioned in different embodiments may be combined in any manner. This application is not limited to the specific embodiments disclosed herein, but includes all technical solutions falling within the scope of the claims.

What is claimed is:

1. A battery cell, comprising:
   a housing, in which an accommodation cavity is formed;
   an electrode assembly, disposed in the accommodation cavity; and
   an electrolyte solution, disposed in the accommodation cavity;
   wherein an electrolyte retention coefficient a and a packing fraction b of the battery cell satisfy following relationship: $2 \leq a/b \leq 3$, and the electrolyte retention coefficient a is in units of g/Ah.

2. The battery cell according to claim 1, wherein the electrolyte retention coefficient a and the packing fraction b of the battery cell satisfy the following relationship: $2.25 \leq a/b \leq 2.90$.

3. The battery cell according to claim 1, wherein the electrolyte retention coefficient a falls within a value range of 1.4 g/Ah to 2.97 g/Ah.

4. The battery cell according to claim 1, wherein the electrolyte retention coefficient a falls within a value range of 1.8 g/Ah to 2.3 g/Ah.

5. The battery cell according to claim 1, wherein the packing fraction b of the battery cell falls within a value range of 80% to 99%.

6. The battery cell according to claim 1, wherein the packing fraction b of the battery cell falls within a value range of 85% to 95%.

7. The battery cell according to claim 1, wherein:
   the electrode assembly comprises:
      a positive electrode plate, comprising a positive current collector and a positive active material layer disposed on at least one surface of the positive current collector, wherein the positive active material layer comprises a positive active material;
      a negative electrode plate, comprising a negative current collector and a negative active material layer disposed on at least one surface of the negative current collector, wherein the negative active material layer comprises a negative active material; and
      a separator, disposed between the positive electrode plate and the negative electrode plate;
   the positive active material is at least one selected from lithium cobalt oxide positive active material, lithium iron phosphate positive active material, lithium manganese oxide positive active material, lithium-rich positive active material, or a ternary positive active material; and
   the negative active material is at least one selected from a carbon-containing negative active material, a silicon-containing negative active material, an alloy negative active material, a lithium-containing negative active material, or a tin-containing negative active material.

8. The battery cell according to claim 7, wherein the ternary positive active material is represented by following chemical formula: $LiNi_xCo_yN_zM_{1-x-y-z}O_2$, wherein N is selected from Mn or Al, M is at least one selected from Co, Ni, Mn, Mg, Cu, Zn, Al, Sn, B, Ga, Cr, Sr, V, or Ti, $0 \leq x < 1$, $0 \leq y \leq 1$, $0 \leq z \leq 1$, and $x+y+z \leq 1$.

9. The battery cell according to claim 7, wherein the lithium-rich positive active material is represented by following chemical formula: $Li_2MnO_3 \cdot (1-c) LiAO_2$, wherein A is at least one selected from Ni, Co, or Mn, and $0 \leq c < 1$.

10. The battery cell according to claim 1, wherein the electrolyte solution comprises an organic solvent and an electrolyte salt, and the organic solvent is at least one selected from an ester compound or an ether compound.

11. The battery cell according to claim 10, wherein the ester compound is at least one selected from dimethyl carbonate, diethyl carbonate, propylene carbonate, ethyl methyl carbonate, fluoroethylene carbonate, ethyl formate, ethyl acetate, or ethylene carbonate.

12. The battery cell according to claim 10, wherein the ether compound is at least one selected from tetrahydrofuran, 2-methylfuran, 3-methylfuran, 2-ethylfuran, 2-propylfuran, 2-butylfuran, 2,3-dimethylfuran, 2,4-dimethylfuran, 2,5-dimethylfuran, pyran, 2-methylpyran, 3-methylpyran, 4-methylpyran, benzofuran, or 2-(2-nitrovinyl) furan.

13. The battery cell according to claim 10, wherein a concentration of the electrolyte salt in the electrolyte solution is 0.6 mol/L to 2.0 mol/L.

14. The battery cell according to claim 10, wherein the electrolyte salt is at least one selected from lithium hexafluorophosphate or lithium bis(fluorosulfonyl)imide.

15. A battery, comprising the battery cell according to claim 1.

16. An electrical device, comprising the battery according to claim 15.

* * * * *